(12) United States Patent
Raniere

(10) Patent No.: US 9,100,904 B2
(45) Date of Patent: Aug. 4, 2015

(54) DATA STREAM DIVISION TO INCREASE DATA TRANSMISSION RATES

(75) Inventor: Keith A. Raniere, Clifton Park, NY (US)

(73) Assignee: FIRST PRINCIPLES, INC., Albany, NY (US)

( * ) Notice: Subject to any disclaimer, the term of this patent is extended or adjusted under 35 U.S.C. 154(b) by 241 days.

(21) Appl. No.: 13/613,230

(22) Filed: Sep. 13, 2012

(65) Prior Publication Data

US 2014/0071968 A1    Mar. 13, 2014

(51) Int. Cl.
*H04J 3/02* (2006.01)
*H04W 48/18* (2009.01)

(52) U.S. Cl.
CPC ..................................... *H04W 48/18* (2013.01)

(58) Field of Classification Search
CPC ........................................................ H04W 48/18
USPC ................................................. 370/338, 536
See application file for complete search history.

(56) References Cited

U.S. PATENT DOCUMENTS

| | | | |
|---|---|---|---|
| H1175 H | 4/1993 | Giorgio | |
| 5,390,239 A | 2/1995 | Morris et al. | |
| 5,809,070 A | 9/1998 | Krishnan et al. | |
| 5,918,021 A | 6/1999 | Aditya | |
| 6,198,749 B1 | 3/2001 | Hui et al. | |
| 6,577,653 B1 * | 6/2003 | Rochberger et al. | 370/536 |
| 6,842,446 B2 | 1/2005 | Everson et al. | |
| 6,914,941 B1 * | 7/2005 | Moshe et al. | 375/260 |
| 6,993,050 B2 | 1/2006 | Desai et al. | |
| 7,177,284 B2 | 2/2007 | Peleg et al. | |
| 7,315,538 B2 | 1/2008 | Wright et al. | |
| 7,424,040 B2 | 9/2008 | Walden | |
| 7,532,562 B2 | 5/2009 | Ridel et al. | |
| 7,630,412 B2 | 12/2009 | Wright et al. | |
| 7,933,298 B2 | 4/2011 | Wright et al. | |
| 2003/0210663 A1 * | 11/2003 | Everson et al. | 370/329 |
| 2004/0190444 A1 | 9/2004 | Trudel et al. | |
| 2005/0232304 A1 | 10/2005 | Quigley | |
| 2006/0098573 A1 | 5/2006 | Beer et al. | |

(Continued)

FOREIGN PATENT DOCUMENTS

WO    2008/097254 A1    8/2008

OTHER PUBLICATIONS

PCT/US2013/059661 International File Date: Sep. 13, 2013—International Search Report & Written Opinion; First Principles, Inc.; 28 pages.

*Primary Examiner* — Hassan Kizou
*Assistant Examiner* — Deepa Belur
(74) *Attorney, Agent, or Firm* — Schmeiser, Olsen & Watts, LLP

(57) ABSTRACT

A method and system for matching bandwidth is provided. The method includes receiving by a first interface device, data. The data is divided into a plurality of data packets and stored within an internal buffer. A first data packet is transmitted to a first communication device communicatively coupled to the first interface device. The first data packet is transmitted from the first communication device to a second interface device via a first communication network. A second data packet is transmitted to a second communication device communicatively coupled to the first interface device. The second data packet is transmitted from the second communication device to the second interface device via a second communication network associated with the second communication device.

40 Claims, 5 Drawing Sheets

(56) References Cited

U.S. PATENT DOCUMENTS

| | | |
|---|---|---|
| 2006/0133430 A1* | 6/2006 | Nagesh et al. ............... 370/536 |
| 2006/0182152 A1* | 8/2006 | Bi et al. ...................... 370/542 |
| 2009/0092137 A1 | 4/2009 | Haigh et al. |
| 2009/0097554 A1* | 4/2009 | Savoor et al. ............ 375/240.08 |
| 2011/0235528 A1* | 9/2011 | Racz et al. .................... 370/244 |
| 2012/0033673 A1 | 2/2012 | Goel |
| 2013/0003760 A1* | 1/2013 | Schwager et al. ............ 370/537 |
| 2013/0041981 A1* | 2/2013 | Kim et al. .................... 709/217 |

* cited by examiner

DATA STREAM DIVISION TO INCREASE DATA TRANSMISSION RATES

FIELD OF TECHNOLOGY

The following relates to a method and associated system for dividing a data stream into multiple data packets and utilizing more than one communication path to transmit the data packets in order to optimize communication reliability and speed based on various needs.

BACKGROUND

Transmitting information typically comprises a time consuming process with little flexibility. Accordingly, there exists a need in the art to overcome at least some of the deficiencies and limitations described herein above.

SUMMARY

A first aspect relates generally to a method comprising: receiving, by a first interface device comprising a computer processor, first data; dividing, by the computer processor, the first data into a plurality of data packets; storing, by the computer processor, the plurality of data packets in data buffers comprised by the first interface device; transmitting, by the computer processor, a first data packet of the plurality of data packets to a first communication device communicatively coupled to the first interface device, wherein the first data packet is transmitted from the first communication device to a second interface device via a first communication network associated with the first communication device; and transmitting, by the computer processor, a second data packet of the plurality of data packets to a second communication device communicatively coupled to the first interface device, wherein the second data packet is transmitted from the second communication device to the second interface device via a second communication network associated with the second communication device, wherein the second interface device stores the first data packet and the second data packet within an internal data buffer, wherein the first data packet differs from the second data packet, wherein the first communication device differs from the second communication device, wherein the first communication network differs from the second communication network.

A second aspect relates generally to an interface apparatus comprising a computer processor coupled to a computer-readable memory unit, the memory unit comprising instructions that when executed by the computer processor implements a method comprising: receiving, by the computer processor, first data; dividing, by the computer processor, the first data into a plurality of data packets; storing, by the computer processor, the plurality of data packets in data buffers comprised by the first interface device; transmitting, by the computer processor, a first data packet of the plurality of data packets to a first communication device communicatively coupled to the first interface device, wherein the first data packet is transmitted from the first communication device to a second interface device via a first communication network associated with the first communication device; and transmitting, by the computer processor, a second data packet of the plurality of data packets to a second communication device communicatively coupled to the first interface device, wherein the second data packet is transmitted from the second communication device to the second interface device via a second communication network associated with the second communication device, wherein the second interface device stores the first data packet and the second data packet within an internal data buffer, wherein the first data packet differs from the second data packet, wherein the first communication device differs from the second communication device, wherein the first communication network differs from the second communication network.

A third aspect relates generally to a computer program product, comprising a computer readable storage device storing a computer readable program code, the computer readable program code comprising an algorithm that when executed by a computer processor of an interface apparatus implements a method, the method comprising: receiving, by the computer processor, first data; dividing, by the computer processor, the first data into a plurality of data packets; storing, by the computer processor, the plurality of data packets in data buffers comprised by the first interface device; transmitting, by the computer processor, a first data packet of the plurality of data packets to a first communication device communicatively coupled to the first interface device, wherein the first data packet is transmitted from the first communication device to a second interface device via a first communication network associated with the first communication device; and transmitting, by the computer processor, a second data packet of the plurality of data packets to a second communication device communicatively coupled to the first interface device, wherein the second data packet is transmitted from the second communication device to the second interface device via a second communication network associated with the second communication device, wherein the second interface device stores the first data packet and the second data packet within an internal data buffer, wherein the first data packet differs from the second data packet, wherein the first communication device differs from the second communication device, wherein the first communication network differs from the second communication network.

A fourth aspect relates generally to a method comprising: providing a system comprising: a first interface device comprising a first computer processor, a second interface device comprising a second computer processor, a first communication device communicatively coupled to the first interface device, a first communication network communicatively coupled between the first communication device and the second interface device, a second communication device communicatively coupled to the first interface device, and a second communication network communicatively coupled between the second communication device and the second interface device; receiving, by the first computer processor, first data; dividing, by the first computer processor, the first data into a plurality of data packets; storing, by the first computer processor, the first data into a plurality of data packets within a buffer comprised by the first interface device; transmitting, by the first computer processor, a first data packet of the plurality of data packets to the first communication device; transmitting, by the first communication device to the second interface device via the first communication network, the first data packet; transmitting, by the first computer processor, a second data packet of the plurality of data packets to the second communication device, the second data packet differing from the first data packet; and transmitting, by the second communication device to the second interface device via the second communication network, the second data packet.

A fifth aspect relates generally to a system comprising: a first interface device comprising a first data buffer, wherein the first interface device is configured to receive first data, divide the first data into a plurality of data packets, and store the plurality of data packets within the first data buffer; a second interface device comprising a second data buffer; a first communication device communicatively coupled to the first interface device, wherein the first interface device is configured to transmit a first data packet of the plurality of data packets to the first communication device; a first communication network communicatively coupled between the first communication device and the second interface device, wherein the first communication device is configured to transmit the first data packet to the second interface device via the first communication network; a second communication device communicatively coupled to the first interface device, wherein the second interface device is configured to transmit a second data packet of the plurality of data packets to the second communication device, the second data packet differing from the first data packet; and a second communication network communicatively coupled between the second communication device and the second interface device, wherein the second communication device is configured to transmit the second data packet to the second interface device via the second communication network, wherein the second interface device is configured to store the first data packet and the second data packet within the second data buffer and regenerate the first data by combining the first data packet and the second data packet.

A sixth aspect relates generally to a method comprising: utilizing, by a first communication device comprising a computer processor, a first connection between the first communication device and a computing device via a first communication network; transmitting, by the computer processor, first data to the computing device via the first communication network; determining, by the computer processor, that the first connection has been disabled; utilizing, by the computer processor, a second connection between the first communication device and a second communication device, wherein the second communication device is connected to the computing device; and transmitting, by the computer processor to the computing device via the second communication device, a remaining portion of the first data, wherein the remaining portion of the first data comprises a portion of data of the first data that was not transmitted to the computing device to the first connection being disabled.

BRIEF DESCRIPTION

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
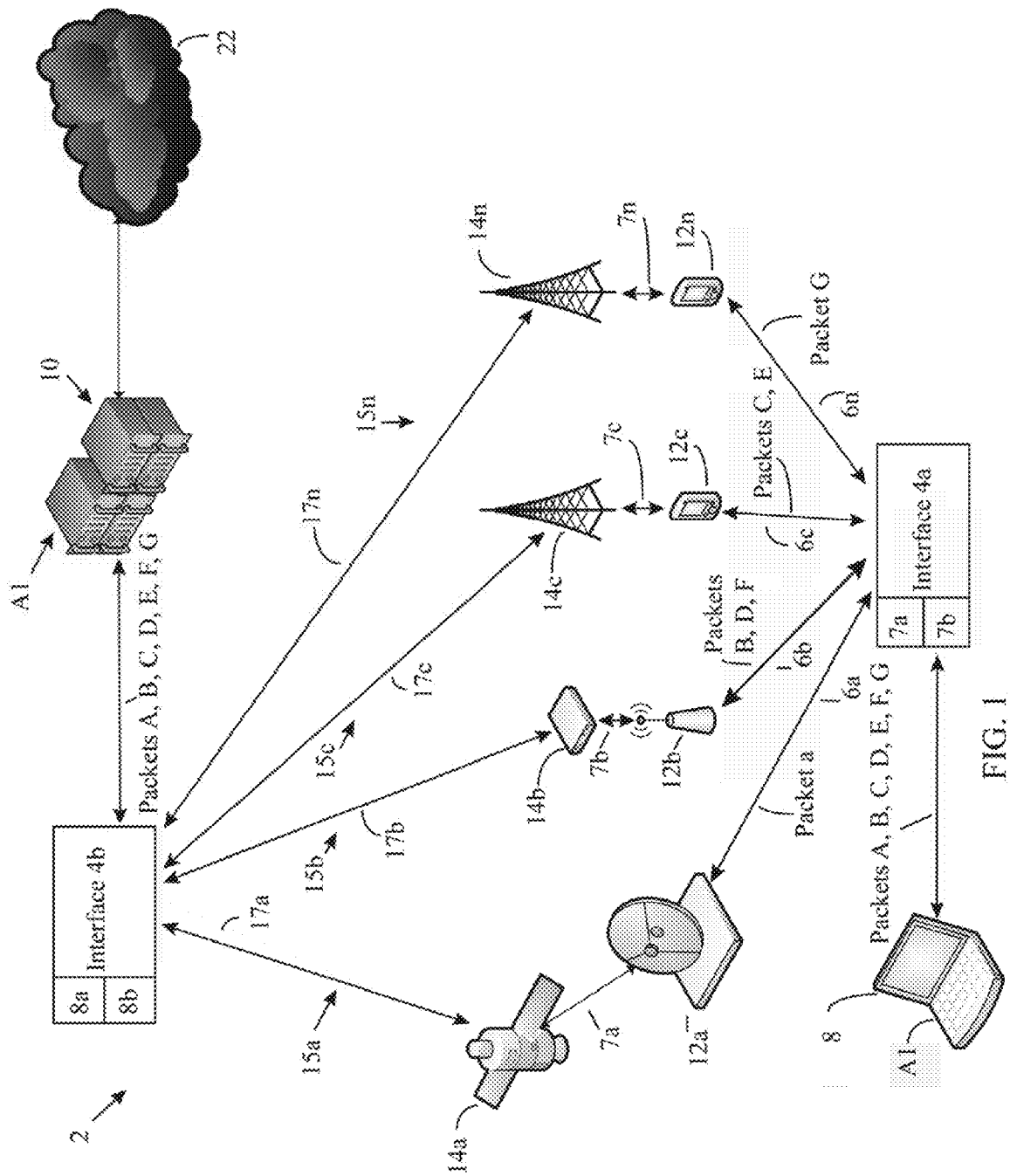
FIG. 1 illustrates an embodiment of a system for allowing interfaces to access multiple available data transmission connections.

Referring to the drawings, FIG. 1 illustrates an embodiment of a system 2 for enabling interfaces 4a and/or 4b to access multiple available data transmission connections. System 2 may utilize any number of the multiple available data transmission connections synchronously and/or on-demand to maximize data transmission rates/quality based on various system and user-defined parameters. Embodiments of system 2 may enable an aggregation of each available connection (or network) into a single data interface (e.g., interfaces 4a and/or 4b) comprising an approximate value of a sum of all the connections aggregated (e.g., an aggregated bandwidth of all of the connections/networks), a seamless connection failover, a prioritization of connection usage based on speed, reliability, cost, etc, a prioritization of data transfer routing based on speed, reliability, etc, and message and data security.

Embodiments of system 2 of FIG. 1 may include devices 8 and 10, interfaces 4a and 4b, network connection devices 12a . . . 12n, networks 15a . . . 15n, and an additional network 22 (e.g., the Internet). Devices 8 and 10 may comprise, inter alia, desktop computers, laptop computers, mobile phones, tablet computers, personal digital assistants (PDA), server computers, mainframe computers, cable modems, wireless routers, etc. Devices 8 and 10 may include communication interfaces associated with different data transmission methodologies such as, inter alia, wired communications, wireless LAN (802.11a,b,g,n) interfaces, microwave interfaces, satellite interfaces, cellular wireless interfaces (e.g., CDMA, 3G, 4G, etc), shortwave radio interfaces, etc. Device 8 may be connected to interface 4a (i.e., wirelessly or via a hardwire connection). Embodiments of interface 4a may be located external to device 8 as illustrated in FIG. 1. Alternatively, embodiments of interface 4a may be located internal to device 8. Embodiments of interface 4a may comprise a hardware interface, a software interface, a virtual interface, or any combination thereof. Interface 4a may comprise multiple internal buffers 7a and 7b for storing data packets prior to transmission and as a backup for transmitted data packets that were not received by a destination device. Device 10 may be connected to interface 44 (wirelessly or via a hardwire connection). Embodiments of interface 4b may be located external to device 10 as illustrated in FIG. 1. Alternatively, embodiments of interface 4b may be located internal to device 10. Interface 4b may comprise a hardware interface, a software interface, a virtual interface, or any combination thereof. Embodiments of interface 4b may comprise multiple internal buffers 8a and 8b for storing data packets prior to transmission and as a backup for transmitted data packets that were not received by a destination device. Embodiments of interface 4a may be connected to a network connection device 12a via a link 6a. Similarly, embodiments of interface 4a may be connected to a network connection device 12b via a link 6b. Embodiments of interface 4a may be connected to a network connection device 12c via a link 6c. Embodiments of interface 4a may be connected to a network connection device 12n via a link 6n. Links 6a . . . 6n may comprise wireless links or hardwired links.

Embodiments of the network connection devices 12a . . . 12n may comprise any type of connection devices including, inter alia, a satellite dish, a wireless access point, a mobile phone, a PDA, etc. Embodiments of network connection device 12a may be connected to interface 4b via network 15a. Embodiments of network 15a may include a network device 14a connecting network connection device 12a to interface 4b via links 7a and 17a. Embodiments of network 15a may comprise any type of network including, inter alia, a satellite network, etc. Embodiments of network device 14a may comprise any type of network device including, inter alia, a satellite, etc. Embodiments of network connection device 12a may be connected to interface 4b via network 15a. Embodiments of network 15b may include a network device 14b connecting network connection device 12b to interface 4b via links 7b and 17b. Embodiments of network 15b may comprise any type of network including, inter alia, a cable TV network, etc. Embodiments of network device 14b may comprise any type of network device including, inter alia, a cable modem, etc. Embodiments of network connection device 12c may be connected to interface 4b via network 15c. Embodiments of network 15c may include a network device 14c connecting network connection device 12c to interface 4b via links 7c and 17c. Embodiments of network 15c may comprise any type of network including, inter alia, a cellular telephone network, etc. Embodiments of network device 14c may comprise any type of network device including, inter alia, a cellular phone tower/infrastructure, etc. Embodiments of network connection device 12n may be connected to interface 4b via network 15n. Embodiments of network 15n may include a network device 14n connecting network connection device 12n to interface 4b via links 7n and 17n. Embodiments of network 15n may comprise any type of network including, inter alia, a cellular telephone network (i.e., differing from or the same as network 15c), etc. Embodiments of network device 14n may comprise any type of network device including, inter alia, a cellular phone tower/infrastructure (i.e., differing from network device 14c), etc.

With continued reference to FIG. 1, embodiments of system 2 illustrates a data file/stream A1 split (e.g., de-multiplexed) into data packets A . . . G (by device 8) and transferred to interface 4a for transmission to interface 4b and device 10. Alternatively, data file/stream A1 may be directly transferred by device 8 to interface 4a and split up into data packets A . . . G (in real time by interface 4a) for transmission to interface 4b and device 10. Each, some, or at least one of packets A . . . G may be stored within one or more data buffers 7a and 7b internal to interface 4a prior to transmission to interface 4b. For instance, packets A . . . G may be stored within the data buffers 7a and 7b to enable transmission of the data packets A . . . G. Additionally, data packets A . . . G may be stored in the data buffers 7a and 7b so that any of packets A . . . G may be transmitted again if the packet has not been received by a destination device (e.g., interface 4b). Each, some, or at least one of packets A . . . G (or some of data packets A . . . G) may be transmitted to a different one of network connection devices 12a . . . 12n for transmission on a different one of networks 15a . . . 15n. Transmitting different data packets of a data file (e.g., data A1) on different networks may allow for an aggregation of bandwidth from multiple networks. An aggregation of bandwidth from multiple networks can allow a large data file/stream to be transmitted to a destination very quickly. When data packets A . . . G are received by interface 4b, they may be stored within one or more internal data buffers 8a and 8b, transmitted to device 10, and combined (e.g., multiplexed) back into a single data file/stream A1. Alternatively, data packets A . . . G may be received, stored, and combined back into a single data file/stream A1 by interface 4b and the single data file/stream A1 may be transmitted to device 10. Embodiments of the aforementioned data splitting/combining process may be performed in an opposite direction going from device 10 to device 8. The following example 1 describes one embodiments of an implementation scenario (enabled by system 2) for transmitting a plurality of data packets across multiple networks.

Example 1

A data file/stream A1 is split into a plurality of data packets A . . . G for transfer to interface 4a. Interface 4a stores the data packets A . . . G (within internal data buffers 7a and 7b) and transmits: data packet A to network 15a via network connection device 12a; data packets B, D, and F to network 15b via network connection device 12b; data packets C and E to network 15c via network connection device 12c; and data packet G to network 15n via network connection device 12n. Data packets A . . . G are received by interface 4b (stored within internal buffers 8a and 8b) and transferred to device 10. Device 10 combines packets A . . . G back into data file/stream A1.

Referring back to FIG. 1, embodiments of system 2, via interface 4a and/or 4b, may enables any one or a combination of the following functions:

1. Aggregation of multiple sources of available bandwidth (i.e., associated with networks 15a . . . 15n) for a device (e.g., device 8 and/or 10) through multiple interface components (e.g., network connection devices 12a . . . 12n) via wired or wireless connections;

2. A failover (e.g., backup) bandwidth for a device (e.g., one of network connection devices 12a . . . 12n). For example, if/when a single connection or infrastructure fails, another connection or infrastructure may be utilized immediately without a loss of a connection;

3. A process for sharing bandwidth between multiple users;

4. A process for alleviating a single point of failure for network connections. The single point of failure may be associated with client hardware, client software, local network hardware/software, an Internet service provider (ISP), etc.;

5. A process enabling secure communications between a user and servers or a user and additional users; and 6. A process enabling best path routing of data to end-users.

Embodiments of system 2 may enable a network accessible device (e.g., devices 8 and 10) to simultaneously employ multiple available network interfaces thereby simultaneously utilizing multiple available network infrastructure and associated bandwidth. Additionally, embodiments of system 2 may enable a network accessible device to employ network interfaces that are not comprised by the device to access additional network resources. Therefore, embodiments of system 2 may enable any network accessible device to utilize an infrastructure and bandwidth of any other network accessible device.

Furthermore, embodiments of system 2 may enable a network accessible device to access and utilize infrastructure and bandwidth of multiple additional network accessible devices as a single network interface for the (parent) network accessible device provided the multiple additional network accessible devices are within a data communication range through a physical or wireless connection.

Additionally, embodiments of system 2 may allow for multiple data transmission protocols/types to be leveraged (e.g., WiFi, 3G, 4G, CDMA, microwave, etc.). For instance, embodiments of system 2 may modify the multiple data transmission protocols/types as agnostic in terms of accessibility to (parent) network accessible device. Embodiments of system 2 may enable a network accessible device to aggregate all available bandwidth from all available and accessible network interfaces to generate a large usable upload and download bandwidth for the device. Embodiments of system 2 may enable a network accessible device to automatically (e.g., without losing a network connection) switch to an interface accessible to the network accessible device if the device's primary interface fails on a hardware, software, or network level. For example, if a laptop computer comprises a WiFi network interface and a mobile phone with a tethered or matched data plan and the WiFi network interface fails (e.g., a hardware card in the laptop fails, a driver for the hardware card fails, a wireless router fails, an ISP fails, etc), the laptop computer may automatically begin using the tethered or matched mobile phone for its network access.

Referring still to FIG. 1, embodiments of system 2 may provide a means for a network accessible device to access the Internet (or any data network) through any local available channels or a combination of available local channels. Embodiments of system 2 may enable a single network accessible device to access and leverage all available infrastructures simultaneously and automatically to select a best combination of network interfaces and associated infrastructures (for enhanced performance) based on user and system assigned rules (e.g., use of a polling process). For example, if a first service provider infrastructure is performing poorly or fails, system 2 may automatically reduce a dependency on an associated network by switching (without losing an Internet connection) to another network. Embodiments of system 2 may automatically determine which available channels to leverage based on a channel performance for data transmission to and from the network accessible device. If a single ISP infrastructure fails or decreases, embodiments of system 2 may automatically adjust a data transmission channel usage to provide a best possible performance to the network accessible device. Embodiments of system 2 may also automatically select one or more channels to leverage and an amount of data to transmit across each, some of, or at least one channel.

Moreover, embodiments of system 2 may enable a network accessible device to increase network performance by overcoming ISP enacted bandwidth resource (usage, speeds, accessibility, etc) limitations by enabling a single device (e.g., interface 4a and/or 4b) to connect to other devices through wired or wireless connections that share same ISP resources. Embodiments of interface 4a and/or 4b may utilize bandwidth resources of all or some of the connected devices. Therefore, if a device X (i.e., utilizing interface 4a and/or 4b) is connected to n other devices on a same ISP infrastructure and each device is allotted z resources by an ISP, device X may access approximately (n*z) bandwidth resources. Additionally, interface 4a and/or 4b may enable all interconnected devices to utilize all shared bandwidth resources (i.e., pooled resources).

Embodiments of system 2 may also allow a user to select a defined bandwidth usage. For example, if a user has access through various network interfaces and other local devices to four network infrastructure connections (e.g., networks 15a . . . 15n): the user may choose to maximize bandwidth usage (e.g., aggregate all available bandwidth for use); use any single connection as primary connection and utilize any remaining connections for backup (failover) bandwidth only; or any combination thereof. Additionally, a user may decide to use all channels or networks to ensure a large (e.g., 20 Mb or more) download connection.

Embodiments of system 2 may enable a peer-to-peer sharing of resources and communications directly without network intervention. Both ends of a peer-to-peer connection may utilize n connection interfaces and gain performance and security benefits of an entire system thereby enabling an Internet-type infrastructure without servers.

Embodiments of system 2 may be directly connected to a computer, mobile phone, a home/business modem or wireless router, etc. and aggregated bandwidth may be leveraged by all computers/devices connecting to that network. For example, four phones may be tethered or matched to a home wireless router and all devices connected to the router may access all system benefits (e.g., security, bandwidth, etc).

Embodiments of system 2 dynamically evaluates available channels (associated with network connection devices 12a . . . 12n and networks 15a . . . 15n) for transmitting each data packet using a combination of data associated with: a current state/status for each existing channel; an aggregate/historic data-set associated with each channel; and an analysis of a current queue for each channel (e.g., each channel may comprise a queue of data packets waiting for transmission). Embodiments of system 2 may periodically analyze each, some, or at least one of the available channels for latency and bandwidth. Analysis results can be added to an aggregate collection of data associated with each, some, or at least one of the channels for a current session as well as historically over multiple past sessions (e.g., via mobile device ID, mobile phone account ID, identifiable wireless network connection, etc). A transmission channel may be selected based upon a current state and a historical performance of that channel at specific intervals. For example, a channel selection may be based upon a sampling of a current state, an average bandwidth/latency/reliability (b/l/r) over the last 5 seconds, an average b/l/r over the last 5 minutes, an average b/l/r for a current session, a lifetime average b/l/r with weighted scores on each data set used for the selection, etc. In the event that all available channels comprise low reliability, system 2 may choose to transmit duplicate packets over multiple channels to increase a likelihood of successful transfer of packets if available bandwidth allows for the performance to be maintained with the available bandwidth. Reliability in the b/l/r set is generally defined as: a channel maintaining consistent end-to-end connection viability (vs. a channel that frequently losses connectivity even for only a few milliseconds), a consistency of latency time vs. a wide range of latency time; a consistent vs. inconsistent bandwidth availability over time; an ISP method for bursting, etc. A result of analysis of current and historical b/l/r for each, some, or at least one of the available channels may be combined with a current queue length for each, some, or at least one of the channels. The analysis may generate a final decision for a transmission channel for a next packet or group of packets. For example, embodiments of system 2 may not transfer packet(s) in a shortest queue if the b/l/r is so low that system 2 determines that it is more likely for the packet to arrive at its destination sooner via a more reliable channel with a longer queue. Therefore, embodiments of system 2 may be enabled to assign different priorities to different packets or packet types so that lower priority packets are sent over lower-rated channels. Additionally, embodiments of system 2 may be enabled to transmit duplicate packets intentionally over multiple channels if one channel is unreliable.

Furthermore, embodiments of system 2 may use historical data associated with one or more channels to determine bursting strategies used by different service providers network or hardware/software interface. For example, a bursting strategy may comprise a company enabling a very large bandwidth (beyond a subscription rate) for a first amount of time (e.g. 10 or 20 seconds) of a download and then throttling the bandwidth available to a user. As system 2 determines bursting strategies for different channels, it may adapt its own decision process for transmitting data over available channels to maximize the use of the providers' bursting strategies. For example, if system 2 determines that a first connection allows a very high bandwidth for 20 seconds after an associated channel unused for 1 minute, it may choose to only utilize the channel for 20 seconds every minute. In this scenario, if a user has three available channels each with a similar bursting strategy, system 2 may attempt to only use a bursting channel and cycle through the 3 channels if system 2 determines that this is a best strategy for maximum overall performance. Additionally, embodiments of system 2 may run tests to establish bursting strategies of unused channels.

Embodiments of system 2 may enable a method for determining a bandwidth and latency of a channel. A reliability of a connection may be determined by an overall consistency of the channel to maintain an active connection over time between system endpoints (e.g., interfaces 4a and 4b). Embodiments of system 2 may calculate a short-term and a long-term bandwidth, latency, and reliability to enable system 2 to determine how viable a channel is and to dynamically assign packets or groups of packets to a channel. In one embodiment, the longer the channel is in use (in a specific session and historically) the greater the ability of system 2 to optimally utilize a channel and develop intelligent channel-utilization strategies. Additionally, system 2 may analyze a physical location (e.g., a GPS location) for a channel analysis or history. For example, a phone connection at a first house may comprise a strong connection while a phone connection at a second house (at a different geographical location) may comprise a weaker connection. Therefore, the two different connections may be evaluated differently.

Embodiments of system 2 may include a series of buffers (e.g., internal to interfaces 4a and 4b) to move data from an original static or streaming data source to transmission channels (interface 4a) and to recompile the data at a receiving point (interface 4b). For instance, embodiments of system 2 may enable the following process for buffer usage:

1. System 2 may enable the data buffers to determine a current aggregate capacity of system 2;
2. A set of data equivalent to a capacity of system 2 over a pre-determined period of time (e.g., 2 seconds, 200 ms, etc) is moved to a transmission buffer;
3. System 2 may determine a number of packets to assign to each channel buffer individually based on each channel's b/l/r, current queue, and overall system intelligence (e.g., known bursting strategies, historical rating, etc); and
4. The packets may be assigned and the process may be repeated until all data has been transmitted.

Figure 2:
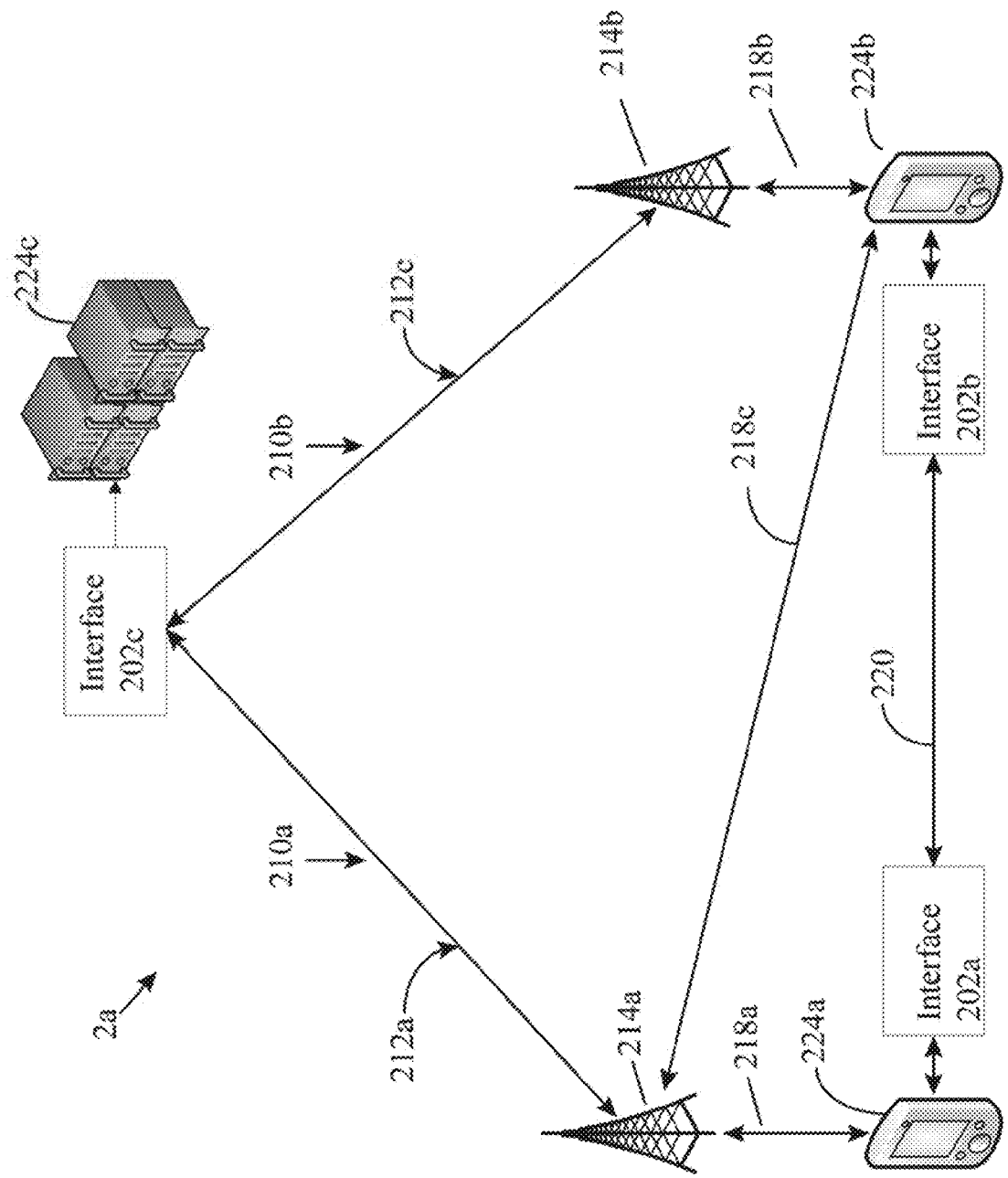
FIG. 2 illustrates an embodiment of an alternative system to the system of FIG. 1 for allowing a device to communicate and share network connectivity with another device.

Referring now to FIG. 2, an embodiment of an alternative system 2a for enabling a device 224a to communicate and share network connectivity with a device 224b is now described. Embodiments of system 2a may enable any network accessible device (e.g., device 224a) to be matched (paired/connected) to any other network accessible device (e.g., device 224b) through a physical connection (e.g., a USB cable connection), a wireless connection, a Bluetooth connection, or any additional local data connection type that can ensure that one of the matched devices (or all) maintains a data signal and/or a voice signal. Embodiments of system 2a may include an ISP/carrier independent system thereby allowing any device (e.g., a cellular phone) to connect to any other device regardless of a specific technology or carrier associated with the device. For example, a cellular phone associated with a network belonging to a first company may be connected to a cellular phone associated with a network belonging to a second (and differing) company. Alternatively, a cellular phone associated with a network belonging to a first company/network may be connected to a cellular phone associated with the same network.

Embodiments of system 2a may include one or more devices 224a and 224b, one or more interfaces 202a, 202b, and 202c, one or more networks 210a and 210b, and a device 224c. Each of interfaces 202a, 202b, and 202c may include multiple buffers as described with respect to interfaces 4a and 4b of FIG. 1. Embodiments of devices 224a, 224b, and 224c may comprise, inter alia, desktop computers, laptop computers, mobile phones, tablet computers, personal digital assistants (PDA), server computers, mainframe computers, cable modems, wireless routers, etc. Embodiments of devices 224a, 224b, and 224c may include one or more communication interfaces associated with different data transmission methodologies such as, inter alia, wireless LAN (802.11a,b, g,n) interfaces, microwave interfaces, satellite interfaces, cellular wireless interfaces (e.g., CDMA, 3G, 4G, etc.), short-wave radio interfaces, etc. Embodiments of device 224a may be connected to an interface 202a (i.e., wirelessly or via a hardwire connection). Embodiments of interface 202a may be located external to device 224a as illustrated in FIG. 2. Alternatively, embodiments of interface 202a may be located internal to device 224a. Embodiments of interface 202a may comprise a hardware interface, a software interface, a virtual interface, or any combination thereof. Embodiments of device 224b may be connected to an interface 202b (i.e., wirelessly or via a hardwire connection). Embodiments of interface 202b may be located external to device 224b as illustrated in FIG. 2. Alternatively, embodiments of interface 202b may be located internal to device 224b. Embodiments of interface 202b may comprise a hardware interface, a software interface, or any combination thereof. Embodiments of device 224c may be connected to an interface 202c (i.e., wirelessly or via a hardwire connection). Embodiments of interface 202c may be located external to device 224c as illustrated in FIG. 2. Alternatively, embodiments of interface 202c may be located internal to device 224c. Embodiments of interface 202c may comprise a hardware interface, a software interface, a virtual interface, or any combination thereof. Embodiments of device 224a may be connected to device 224b via a link 220 (wireless or wired). Embodiments of device 224a may be connected to network 210a via a link 218a. Embodiments of network 210a may include a network device 214a connecting device 224a to interface 202c via link 212a. Embodiments of network 210a may comprise any type of network including, inter alia, a cellular network, a satellite network, etc. Embodiments of network device 214a may comprise any type of network device including, inter alia, a cellular tower, a satellite, etc. Embodiments of device 224b may be connected to network 210b via a link 218b. Additionally, embodiments of device 224b may be connected to network 210a via a link 218c. Embodiments of network 210b may include a network device 214b connecting device 224b to interface 202c via link 212c. Embodiments of network 210b may comprise any type of network including, inter alia, a cellular network, a satellite network, etc. Embodiments of network 210a and network 219b may be comprised by a same network or different networks. Embodiments of network device 214b may comprise any type of network device including, inter alia, a cellular tower, a satellite, etc.

With continued reference to FIG. 2, embodiments of system 2a may enable a process for automatically switching networks if a problem is encountered with one of the networks. For example, if network 210a is disabled (e.g., a network outage due to a malfunction) during communications between device 224a and 224c, system 2a may automatically utilize a connection between devices 224a and 224b (via interfaces 202a and 202b and link 220). The connection between devices 224a and 224b may allow device 224a to communicate with device 224c using network 210b associated with device 224b. The aforementioned process may be additionally enabled to increase a flow of data if network 210a is operating at a less than optimal speed due to increased network traffic.

Figure 3:
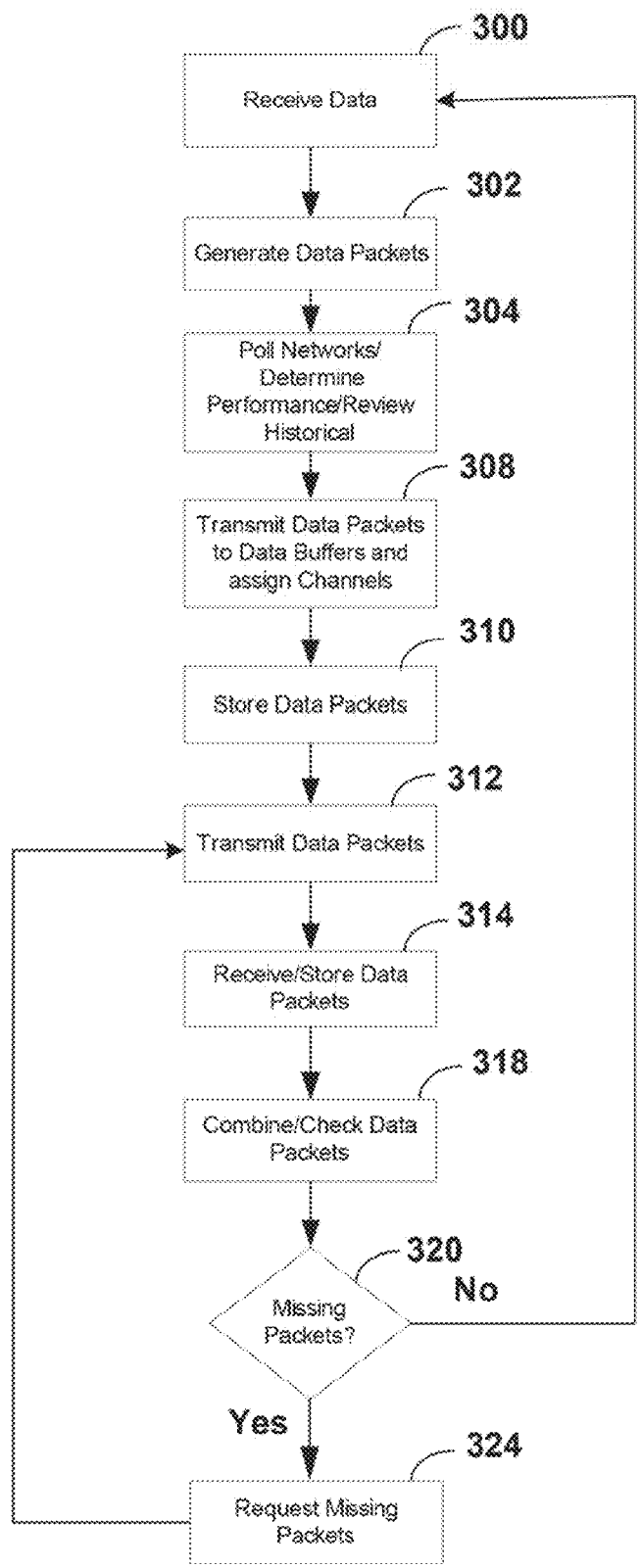
FIG. 3 illustrates an embodiment of an algorithm detailing a process flow enabled by the systems of FIG. 1 and FIG. 2.

With further reference to the drawings, FIG. 3 illustrates an embodiment of an algorithm detailing a process flow enabled by system 2 of FIG. 1 for enabling interfaces to access multiple available data transmission connections. In step 300, a first interface device (e.g., interface device 4a of FIG. 1) may receive data (e.g., from a computer via the Internet). The data may include static data or a data stream. In step 302, the first interface device may divide (i.e., de-multiplexes) the data file into one or more data packets. In step 304, the first interface may optionally poll multiple independent communication networks (e.g., networks 15 ... 15n of FIG. 1), may determine performance/reliability/current network state, and may review historical connection data for various transmission attributes. For example, the first interface optionally may determine, inter alia, network traffic, network data transmission quality, network availability, historical data associated with previous connections, etc. In step 308, the first interface device may transmit the data packets to internal buffers. For example, the data packets may be transmitted to transmission buffer(s) and a re-send buffer. In step 310, the data packets may be stored within specified buffers based on results of the analysis performed in step 304. In step 312, the different data packets (of the data packets) may be transmitted across different networks (of the multiple independent communication networks) based on the results of analysis performed in step 304. As a first example, each, some, or at least one of the networks transmits a different (single) data packet. As a second example, each, some, or at least one of the networks transmits a different group of data packets. In step 314, the transmitted data packets may be received by a second interface device (e.g., interface device 4b of FIG. 1) and may be stored within one or more internal buffers. In step 318, the second interface device may combine the data packets (thereby regenerating the data file). In step 320, it is determined (automatically or manually) if all transmitted data packets have been received by the second interface device. If in step 320, it is determined that some of the transmitted data packets have not been received by the second interface device then in step 324, the transmitted data packets are re-requested if it is determined that a channel has malfunctioned (e.g., a telephone channel is disabled, a wifi signal is disabled, etc.). In this case, system 2 re-requests all data packets that were assigned to the disabled channel and were in transit. If system 2 does not detect any disconnected lines, system 2 will determined a specified elapsed time period and transmit the data stream/packets on to a client program. If the missing packet(s) arrive at a later time, system 2 will transmit the missing packet(s) immediately as they arrive. If the client program (i.e., an end program using the missing packet(s)) determines that it requires a missing data packet, it will automatically re-request the missing data via system 2 and steps 300-320 are repeated. In repeated step 318, a reconstituted data stream is delayed for transmission if: (a) a data packet is missing or (b) a later data packet arrives on a same channel as the missing packet was expected. Therefore, a missing packet is assumed lost and a re-combined data packets/stream is transmitted to the client program. If a data packet has not arrived for a period exceeding a latency period (as determined by system 2) of an assigned channel, the packet is considered lost and the system moves on without it. For example, if system 2 determines that a channel X includes a latency period of 75 milliseconds and a packet A arrives at a second interface device and after the 75 millisecond latency period has elapsed, a packet B (a next packet expected by system 2 via Channel X) has not arrived, system 2 assumes the packet B is lost and continues intended functionality. If it is determined (by the client program) that the missing data packet is needed, the client program re-requests the packet and the re-requested packet is processed by system 2. If in step 320, it is determined that all of the transmitted data packets have been received by the second interface device then step 300 may be repeated for a new data file or stream. Steps 318 and 320 may be performed in any order.

Figure 4:
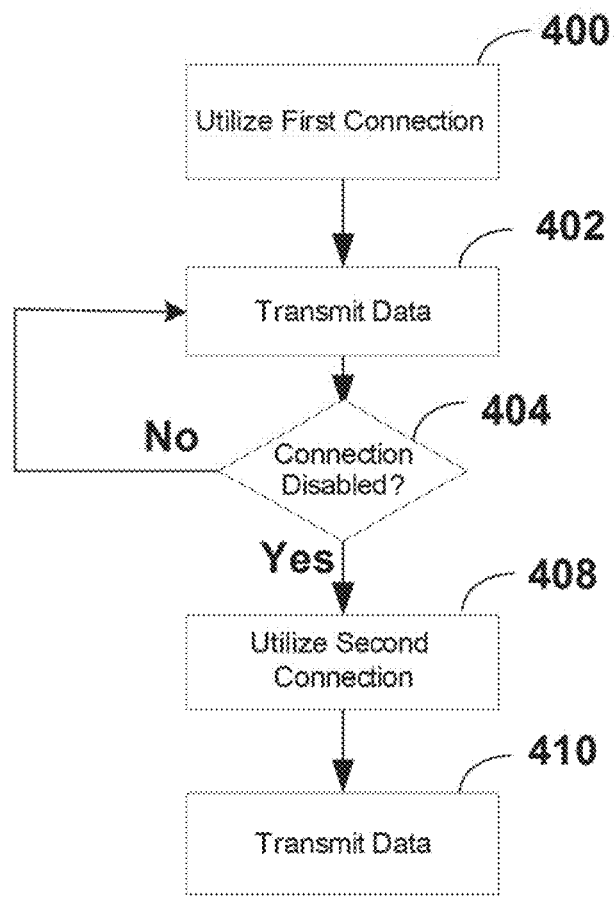
FIG. 4 illustrates an embodiment of an algorithm detailing a process flow enabled by the systems of FIG. 1 and FIG. 2.

With reference now to FIG. 4, an embodiment of an algorithm detailing a process flow enabled by system 2a of FIG. 2 for enabling a device to communicate and share network connectivity with an additional device is now described. In step 400, a first communication device may enable and/or utilize a first connection between the first communication device and a computing device via a first communication network. In step 402, the first communication device may transmit data (e.g., voice, text, video, etc) to the computing device via the first communication network. In step 404, the first communication device may determine if the first connection has been disabled. If in step 404, the first communication device may determine that the first connection has not been disabled then the data transmission process continues in step 402. If in step 404, the first communication device determines that the first connection has been disabled then in step 408, a second connection between the first communication device and a second communication device may be enabled and/or utilized. The second communication device may be connected to the computing device (e.g., via a second communication network differing from the first communication network or via the first communication network. In step 410, the first communication device may transmit a remaining portion of the data to the computing device via the second communication device. The remaining portion of the data may include a portion of data of the data that was not transmitted to the computing device via the communication network due to the first connection being inoperable.

Figure 5:
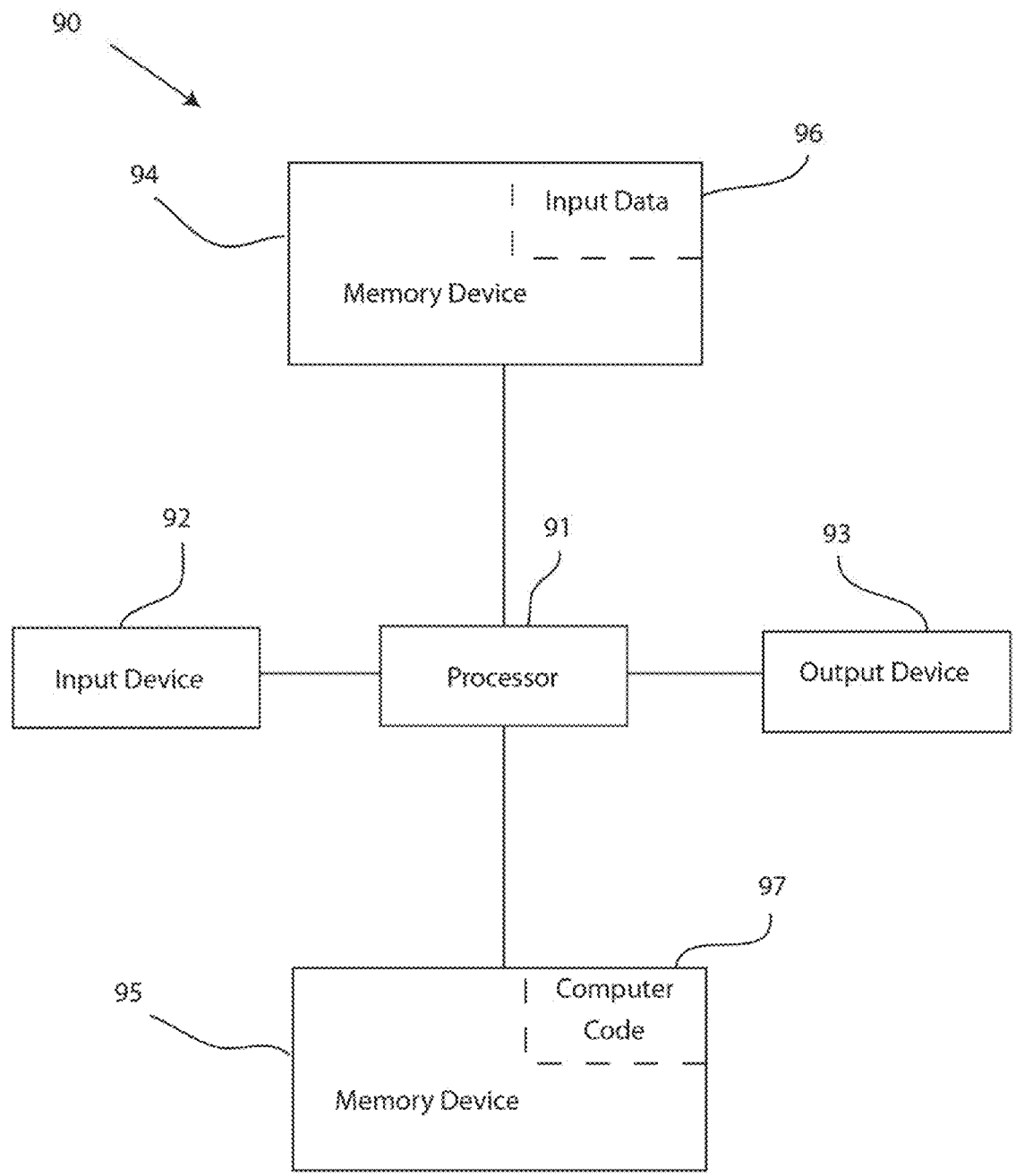
FIG. 5 illustrates an embodiment of a computer apparatus used for allowing interfaces to access multiple available data transmission connections.

Referring still to the drawings, FIG. 5 illustrates an embodiment of a computer apparatus 90 used by embodiments of system 2 of FIG. 1 and embodiments of system 2a of FIG. 2 for enabling interfaces to access multiple available data transmission connections. Embodiments of the computer system 90 may include a processor 91, an input device 92 coupled to the processor 91, an output device 93 coupled to the processor 91, and memory devices 94 and 95 each coupled to the processor 91. The input device 92 may be, inter alia, a keyboard, a mouse, microphone, etc. The output device 93 may be, inter alia, a printer, a plotter, a computer screen, cell phone screen, a tablet display, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes code enabled for enabling interfaces to access multiple available data transmission connections. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise computer code and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or the program storage device).

While FIG. 5 shows an embodiment of a computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed is:

1. A method for data-stream division, the method comprising:
    receiving, by a data-stream division apparatus, a first data set;
    dividing, by the apparatus, the first data set into a plurality of data packets;
    storing, by the apparatus, the plurality of data packets in one or more internal transmission buffers comprised by the apparatus;
    first polling, by the apparatus, a first network of a plurality of networks;
    second polling, by the apparatus, a second network of the plurality of networks;
    analyzing, by the apparatus, historical data associated with previous connections to the first network and the second network;
    determining, by the apparatus based on results of the first polling and the second polling, a data transfer viability of at least one of the first network and the second network, wherein the determining is further based on results of the analyzing, by the apparatus, of the historical data;
    selecting, by the apparatus, the first network, wherein each network of the plurality of networks connects a communication device of a plurality of communication devices to a destination device, wherein the first network connects a first communication device of the plurality of communication devices to the destination device, and wherein the selecting is performed as a function of the data transfer viability of the first network;
    transmitting, by the apparatus, a first data packet of the plurality of data packets to the destination device via the first communication device and the first network;
    further selecting, by the apparatus, the second network of the plurality of networks, wherein the second network connects a second communication device of the plurality of communication devices to the destination device, wherein the first network and the second network do not use an identical set of communications protocols, and wherein the selecting is performed as a function of the data transfer viability of the the second network;
    further transmitting, by the apparatus, a second data packet of the plurality of data packets to the destination device via the second communication device and the second network, wherein the first data packet is distinct from the second data packet; and
    instructing the destination device, by the apparatus, to store the first data packet and the second data packet in their original sequence in an internal data buffer of the destination device.

2. The method of claim 1, further comprising the apparatus, prior to either the selecting or the further selecting, determining that the one or more internal transmission buffers comprise storage capacity sufficient to contain the first data set.

3. The method of claim 1, further comprising:
    transmitting, by the apparatus, a third data packet of the plurality of data packets to the destination device via the first communication device and the first network, wherein the third data packet is distinct from both the first data packet and the second data packet; and
    instructing the destination device, by the apparatus, to store the first, second, and third data packets in their original sequence in the internal data buffer of the destination device.

4. The method of claim 1, wherein the data-stream division apparatus comprises a discrete device of a plurality of discrete devices.

5. The method of claim 1, wherein the data-stream division apparatus is comprised by a computing apparatus.

6. The method of claim 5, wherein the computing apparatus-comprises an apparatus selected from the group consisting of: a personal computer, a laptop computer, a tablet computer, a game console, a WiFi mobile device, a portable media player, a PDA, a server, a router device, a cellular telephone, and an other mobile device.

7. The method of claim 1, wherein the first communication device and the second communication device each comprise a device selected from the group consisting of a satellite dish, a wireless access point, a PDA, a hardwired router, a radio transmitter/receiver, an infra-red communication device, a microwave dish, and a cellular telephone.

8. The method of claim 1, wherein,
    the first polling and the second polling occur simultaneously.

9. The method of claim 1, further comprising:
    polling, by the apparatus, n communication devices of the plurality of communication devices and associated networks of the plurality of networks;
    determining, by said apparatus based on results of said polling, a data transfer viability of each communication device of the n communication devices and the associated networks.

10. The method of claim 1, further comprising:
    analyzing, by the apparatus, historical data associated with previous connections to n communication networks of the plurality of networks.

11. The method of claim 1, further comprising:
transmitting, by the apparatus based on the determining the data transfer viability, a third data packet of the plurality of data packets to the destination device via a third communication device of the plurality of communication devices and a third communication network of the plurality of networks, wherein the third data packet is distinct from both the first data packet and the second data packet; and
instructing the destination device, by the apparatus, to store the first, second, and third data packets in their original sequence in the internal data buffer of the destination device.

12. The method of claim 11, further comprising:
transmitting, by the apparatus, a data packet of the plurality of data packets on any of n communication devices of the plurality of communication devices and associated communication networks network of the plurality of networks.

13. The method of claim 8, wherein the first polling and the second polling occur sequentially.

14. The method of claim 1, further comprising:
receiving, by the apparatus from an external source, analyzed historical data associated with previous connections to either the first communication network or the second communication network.

15. The method of claim 1, wherein the first communication network comprises a first bandwidth, wherein the second communication network comprises a second bandwidth, and wherein the transmitting the first data packet and the transmitting the second data packet results in generating an aggregated bandwidth equal to a sum of the first bandwidth and the second bandwidth.

16. The method of claim 1, wherein the first communication device and the second communication device comprise a same communication device.

17. The method of claim 1, further comprising:
transmitting, by the apparatus, a data packet x of the plurality of data packets to any communication device of the plurality of communication devices and to any associated network of the plurality of networks that is coupled to said apparatus.

18. A data-stream division apparatus comprising a computer processor coupled to a computer-readable memory unit, the memory unit comprising instructions that, when executed by the computer processor, implements a method comprising:
receiving, by the data-stream division apparatus, a first data set;
dividing, by the apparatus, the first data set into a plurality of data packets;
storing, by the apparatus, the plurality of data packets in one or more internal transmission buffers comprised by the apparatus;
first polling, by the apparatus, a first network of a plurality of networks;
second polling, by the apparatus, a second network of the plurality of networks;
analyzing, by the apparatus, historical data associated with previous connections to the first network and the second network;
determining, by the apparatus based on results of the first polling and the second polling, a data transfer viability of at least one of the first network and the second network, wherein the determining is further based on results of the analyzing, by the apparatus, of the historical data;
selecting, by the apparatus, the first network, wherein each network of the plurality of networks connects a communication device of a plurality of communication devices to a destination device, wherein the first network connects a first communication device of the plurality of communication devices to the destination device, and wherein the selecting is performed as a function of the data transfer viability of the first network;
transmitting, by the apparatus, a first data packet of the plurality of data packets to the destination device via the first communication device and the first network;
further selecting, by the apparatus, the second network of the plurality of networks, wherein the second network connects a second communication device of the plurality of communication devices to the destination device, wherein the first network and the second network do not use an identical set of communications protocols, and wherein the selecting is performed as a function of the data transfer viability of the second network;
further transmitting, by the apparatus, a second data packet of the plurality of data packets to the destination device via the second communication device and the second network; and
instructing the destination device, by the apparatus, to store the first data packet and the second data packet in their original sequence in an internal data buffer of the destination device.

19. A computer program product, comprising a computer readable storage device storing a computer readable program code, the computer readable program code comprising an algorithm that when executed by a computer processor of a data-stream division apparatus implements a method, the method comprising:
receiving, by the data-stream division apparatus, a first data set;
dividing, by the apparatus, the first data set into a plurality of data packets;
storing, by the apparatus, the plurality of data packets in one or more internal transmission buffers comprised by the apparatus;
first polling, by the apparatus, a first network of a plurality of networks;
second polling, by the apparatus a second network of the plurality of networks;
analyzing, by the apparatus, historical data associated with previous connections to the first network and the second network;
determining, by the apparatus based on results of the first polling and the second polling, a data transfer viability of at least one of the first network and the second network, wherein the determining is further based on results of the analyzing, by the apparatus, of the historical data;
selecting, by the apparatus, the first network, wherein each network of the plurality of networks connects a communication device of a plurality of communication devices to a destination device, wherein the first network connects a first communication device of the plurality of communication devices to the destination device, and wherein the selecting is performed as a function the data transfer viability of the first network;
transmitting, by the apparatus, a first data packet of the plurality of data packets to the destination device via the first communication device and the first network;
further selecting, by the apparatus, a second network of the plurality of networks, wherein the second network connects a second communication device of the plurality of communication devices to the destination device, wherein the first network and the second network do not use an identical set of communications protocols, and wherein the selecting is performed as a function of the data transfer viability of the the second network;

further transmitting, by the apparatus, a second data packet of the plurality of data packets to the destination device via the second communication device and the second network; and instructing the destination device, by the apparatus, to store the first data packet and the second data packet in their original sequence in an internal data buffer of the destination device.

20. A method comprising:

providing a system comprising: a data-stream division apparatus comprising a first computer processor, a destination device comprising a second computer processor, a first communication device of a plurality of communication devices and a second communication device of the plurality of communication devices, wherein each communication device of the plurality of communications devices connects the apparatus to the destination device by means of a network of a plurality of networks, and wherein the first communication device connects the apparatus to the destination device by means of a first network of the plurality of networks, and the second communication device connects the apparatus to the destination device by means of a second network of the plurality of networks;

receiving, by a data-stream division apparatus, a first data set;

dividing, by the apparatus, the first data set into a plurality of data packets;

storing, by the apparatus, the plurality of data packets in one or more internal transmission buffers comprised by the apparatus;

first polling, by the apparatus, the first network of the plurality of networks;

second polling, by the apparatus, the second network of the plurality of networks;

analyzing, by the apparatus, historical data associated with previous connections to the first network and the second network;

determining, by the apparatus based on results of the first polling and the second polling, a data transfer viability of at least one of the first network and the second network, wherein the determining is further based on results of the analyzing, by the apparatus, of the historical data;

transmitting, by the apparatus, a first data packet of the plurality of data packets to the first communication device;

instructing, by the apparatus, the first communication device to forward the first data packet to the destination device via the first network;

further transmitting, by the apparatus, a second data packet of the plurality of data packets to the second communication device, wherein the second data packet is distinct from the first data packet; and further instructing, by the apparatus, the second communication device to forward the second data packet to the destination device via the second network.

21. The method of claim 20, further comprising:

instructing the second processor, by the apparatus, to store the first data packet and the second data packet in their original sequence in an internal data buffer of the destination device.

22. The method of claim 20, further comprising:

transmitting, by the first computer processor, a third data packet of the plurality of data packets to the first communication device, wherein the third data packet is distinct from both the first data packet and the second data packet; and transmitting, by the first communication device to the destination device via the first communication network, the third data packet; and instructing the destination device, by the apparatus, to store the first, second, and third data packets in their original sequence in the internal data buffer of the destination device.

23. The method of claim 20, wherein the data-stream division apparatus and the destination device each comprises a discrete device of a plurality of discrete devices.

24. The method of claim 20, wherein the data-stream division apparatus is comprised by a first computing apparatus, and wherein the destination device is comprised by a second computing apparatus.

25. The method of claim 20, further comprising:

providing within the system, a third communication device of the plurality of communication devices and a third communication network of the plurality of networks communicatively coupled between the third communication device and the destination device;

transmitting, by the first computer processor based on the data transfer viability, a third data packet of the plurality of data packets to the third communication device, wherein the third data packet is distinct from both the first data packet and the second data packet;

transmitting, by the third communication device to the destination device via the third communication network, the third data packet; and instructing the destination device, by the apparatus, to store the first, second, and third data packets in their original sequence in the internal data buffer of the destination device.

26. A system comprising:

a data-stream division apparatus comprising a first data buffer, wherein the apparatus is configured to receive a first data set, divide the first data set into a plurality of data packets, and store the plurality of data packets within the first data buffer;

a destination device comprising a second data buffer;

a first communication device of a plurality of communication devices, wherein each communication device of the plurality of communication devices connects the apparatus to the destination device via a network of a plurality of networks, and wherein the apparatus is configured to transmit a first data packet of the plurality of data packets to the first communication device;

a first communication network of the plurality of networks, wherein the first communication device is configured to transmit the first data packet to the destination device via the first communication network, the first communication network being polled by the apparatus, wherein historical data associated with previous connections to the first communication network are analyzed, the results of the polling and the analyzing being used to determine a data transfer viability of the first communication network, further wherein the first communication network is selected by the data-stream division apparatus as a function of a data-transmission rate of the first communication network;

a second communication device of the plurality of communication devices, wherein the destination device is configured to transmit a second data packet of the plurality of data packets to the second communication device, and wherein the second data packet is distinct from the first data packet; and a second communication network of the plurality of networks, wherein the second communication device is configured to transmit the second data packet to the destination device via the second communication network, the second communication network being polled by the apparatus, wherein historical data associated with previous connections to the second communication network are analyzed, the results of the polling and the analyzing being used to determine a data transfer viability of the second communication network, further, wherein the destination device is configured to store the first data packet and the second data packet within the second data buffer in their original sequence.

27. A method comprising:

utilizing, by a first communication device of a plurality of communication devices comprising a computer processor, a first connection between the first communication device and a computing device via a first communication network of a plurality of networks;

transmitting, by the first communication device, a first data set to the computing device via the first communication network, wherein the first data set is received by a data-stream division apparatus that has selected the first network to receive the first data set as a function of a data-transmission rate of the first communication device over the first network;

determining, by the first communication device, that the first connection has malfunctioned;

identifying, in response to the malfunctioning, by the first communication device, a second connection between the first communication device and a second communication device of the plurality of communication devices, wherein the second communication device is connected to the computing device; and transmitting, by the first communication device to the computing device via the second communication device, a remaining portion of the first data set, wherein the remaining portion of the first data set comprises a portion of data of the first data set that was not transmitted to the computing device due to the first connection being disabled;

wherein the data-transmission rate of the first communication device over the first network is determined by polling, by the apparatus, the first communication device of the plurality of communication devices and the first network of the plurality of networks and analyzing, by the apparatus, historical data associated with previous connections to the first communication network.

28. The method of claim 27, wherein the second communication device is connected to the computing device via a second communication network of the plurality of networks, wherein the second communication network is distinct from the first communication network.

29. The method of claim 27, wherein the second communication device is connected to the computing device via the first communication network.

30. The method of claim 27, further comprising:

determining, by the first communication device, that the first connection is currently functional; and disabling, by the first communication device, data flow between the first communication device and the second communication device.

31. The method of claim 27, wherein the determining that the first connection has been disabled comprises:

determining that a connection between the first communication device and the first communication network has been disabled or has malfunctioned.

32. The method of claim 27, wherein the determining that the first connection has been disabled comprises:

determining that a connection between the first communication network and the computing device has been disabled or has malfunctioned.

33. The method of claim 32, further comprising:

determining, by the first communication device, that the first communication network has malfunctioned.

34. The method of claim 27, wherein the first data set comprises voice/audio data.

35. The method of claim 27, wherein the first data set comprises video data.

36. The method of claim 27, wherein the first data set comprises text data.

37. The method of claim 27, wherein the first data set comprises computer code or computer readable data.

38. A method comprising:

receiving, by a first cellular telephone comprising a computer processor, a first data set;

dividing, by the first cellular telephone, the first data set into a plurality of data packets;

storing, by the first cellular telephone, the plurality of data packets in one or more internal transmission buffers comprised by the first cellular telephone;

transmitting, by the first cellular telephone, the plurality of data packets to a third interface via a mobile cellular device communicatively coupled to the first cellular telephone, wherein the transmission is performed via a first communication network associated with the mobile cellular device, wherein the first cellular telephone selects the first communication network is performed as a function of a data-transmission rate of the first cellular telephone over the first network; and transmitting, by the first cellular telephone, the plurality of data packets to the third interface, wherein a second data packet, distinct from the plurality of data packets, is transmitted from the first cellular telephone to the plurality of data packets via a second communication network associated with the first cellular telephone, and wherein the first communication network may be distinct from the second communication network;

wherein the data-transmission rate of the first cellular telephone over the first network is determined by polling, by the apparatus, the first cellular telephone and the first network and analyzing, by the apparatus, historical data associated with previous connections to the first communication network.

39. The method for data-stream division of claim 1, wherein the first polling includes polling the first communication device of the plurality of communication devices.

40. The method for data-stream division of claim 1, wherein the second polling includes polling the second communication device of the plurality of communication devices.

* * * * *

UNITED STATES PATENT AND TRADEMARK OFFICE
CERTIFICATE OF CORRECTION

PATENT NO. : 9,100,904 B2  Page 1 of 1
APPLICATION NO. : 13/613230
DATED : August 4, 2015
INVENTOR(S) : Keith A. Raniere It is certified that error appears in the above-identified patent and that said Letters Patent is hereby corrected as shown below:

Title Page, Item (56), References Cited/U.S. Patent Documents, "H1175" should be --H001175--.

In the Claims

Column 16, Line 60, delete "as a function the data" and insert --as a function of the data--.

Column 20, Line 40, delete "is performed".

Signed and Sealed this
Twenty-eighth Day of June, 2016

Michelle K. Lee
*Director of the United States Patent and Trademark Office*